United States Patent
Erden

(10) Patent No.: US 8,238,500 B2
(45) Date of Patent: Aug. 7, 2012

(54) CHANNEL ARCHITECTURE WITH MULTIPLE SIGNAL PROCESSING BRANCHES FOR A GIVEN PHYSICAL CHANNEL

(75) Inventor: Mehmet Fatih Erden, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 923 days.

(21) Appl. No.: 11/865,875

(22) Filed: Oct. 2, 2007

(65) Prior Publication Data

US 2009/0086846 A1    Apr. 2, 2009

(51) Int. Cl.
H04B 1/10    (2006.01)
(52) U.S. Cl. .............. 375/349; 375/260; 375/350
(58) Field of Classification Search .......... 375/349, 375/260, 350
See application file for complete search history.

(56) References Cited

U.S. PATENT DOCUMENTS

| | | | |
|---|---|---|---|
| 5,568,142 A | | 10/1996 | Velazquez et al. |
| 6,160,508 A | * | 12/2000 | Gustavsson et al. .......... 341/155 |
| 6,177,893 B1 | * | 1/2001 | Velazquez et al. ............ 341/118 |
| 6,653,959 B1 | * | 11/2003 | Song ............................. 341/131 |
| 7,595,948 B1 | * | 9/2009 | Oberg ............................. 360/25 |
| 2002/0080898 A1 | * | 6/2002 | Agazzi et al. ................. 375/355 |
| 2003/0206604 A1 | * | 11/2003 | Lai ................................. 375/350 |
| 2005/0156775 A1 | * | 7/2005 | Petre et al. .................... 341/155 |
| 2006/0097901 A1 | * | 5/2006 | Draxelmayr et al. ......... 341/155 |
| 2008/0212715 A1 | * | 9/2008 | Chang ........................... 375/317 |

OTHER PUBLICATIONS

T.K. Sakar et al., "A Tutorial on Waveletes from an Electrical Engineering Perspective, Part 1: Discrete Wavelett Techniques" IEEE Antennas and Propagation Magazine, 40:49-70, 1998.
S.R. Velazques, et al., "Design of Hybrid Filter Banks for Analog/Digital Conversion" IEEE Trans. Signal Proc., 46:956-967, 1998.
M.F. Erden et al., "Thermal Asperity Detection and Cancelation for Perpendicular Magnetic Recording Systems", IEEE Trans on Magnetics, 40:1732-1737, 2004.
M.F. Erden et al., "Base-Line Wander Compensation for Perpendicular Recording" IEEE Trans on Magnetics, 40:3114-3116, 2004.

* cited by examiner

Primary Examiner — Kabir A Timory
(74) Attorney, Agent, or Firm — Westman, Champlin & Kelly, P.A.

(57) ABSTRACT

A communication system includes a physical communication channel. A signal is transmitted across the communication channel from a transmit end of the channel to a receive end of the channel. A plurality of processing branches process the signal at the receive end of the communication channel. This reduces complexity of the receive channel, without reducing a bandwidth of the given communication channel, and without comprising performance.

18 Claims, 17 Drawing Sheets

CHANNEL ARCHITECTURE WITH MULTIPLE SIGNAL PROCESSING BRANCHES FOR A GIVEN PHYSICAL CHANNEL

BACKGROUND

Communication channels include transmit/receive channels. One example of a communication channel is a read channel in a data storage system. While the present discussion can be applied to substantially any transmit/receive channel, it will be described in the context of a read channel used in a storage system, for the sake of example only.

Many computer systems currently use magnetic or optical storage media. There is also currently a large demand to increase storage space in order to accommodate the storage of extensive applications, operating systems, and other information that may be desired by a user. This has naturally led to a desire to increase the areal density of data storage systems, such as the magnetic or optical storage media. In fact, some designers of storage media have viewed the increase of areal density as a primary design consideration.

However, increasing bandwidth of any transmit/receive channel, including increasing areal density of storage media does present certain problems. For instance, architectures which can store more information often result in more complex storage systems which are more costly, and require more power. In addition, read channel architectures which are designed to read data from the higher density storage media have also been more complex, more costly, and often have increased power requirements.

Embodiments of the present system address these and other problems, and offer other advantages over the prior art.

SUMMARY

A communication system includes a physical communication channel. A signal is transmitted across the communication channel from a transmit end of the channel to a receive end of the channel. A plurality of processing branches process the signal at the receive end of the communication channel. This reduces complexity of the receive end of the channel, without reducing a bandwidth of the given communication channel, and without compromising performance.

Other features and benefits that characterize embodiments of the present system will be apparent upon reading the following detailed description and review of the associated drawings.

DETAILED DESCRIPTION OF ILLUSTRATIVE EMBODIMENTS

Figure 1:
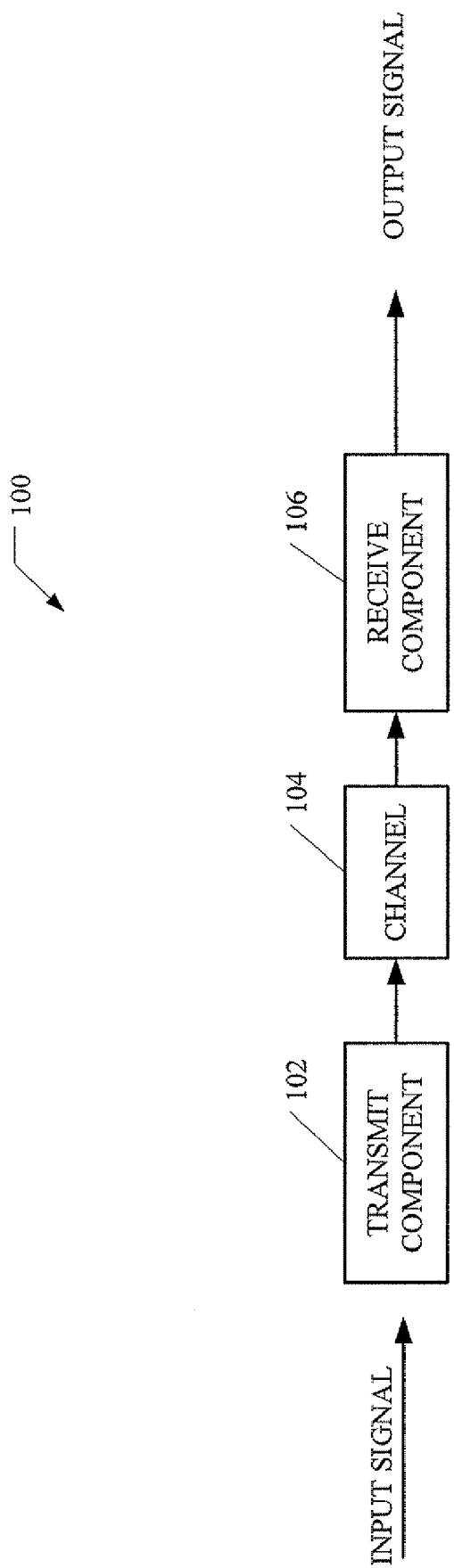
FIG. 1 is a block diagram of one embodiment of a communication channel.

FIG. 1 is a block diagram of one illustrative embodiment of a communication channel 100. Channel 100 includes transmit component 102, channel 104 and receive component 106. An input signal is provided to transmit component 102 where it is processed (such as encoded, amplified, conditioned, etc.) and provided to channel 104. Channel 104 communicates the signal (according to some type of transition response) to receive component 106. Receive component 106 also performs processing on the signal, after it has passed through channel 104. Processing by component 106 can include such things as amplifying, filtering, converting from an analog signal to a digital signal, equalizing the signal, detecting the content of the signal, and decoding that content, by way of example.

While the present discussion can be applied to substantially any communication channel, it is described herein, by way of example only, in terms of a data storage system, such as a data storage system that stores data using magnetic or optical storage media. Of course, this is not to be construed in any way as limiting the claims or scope of the present invention.

Figure 2:
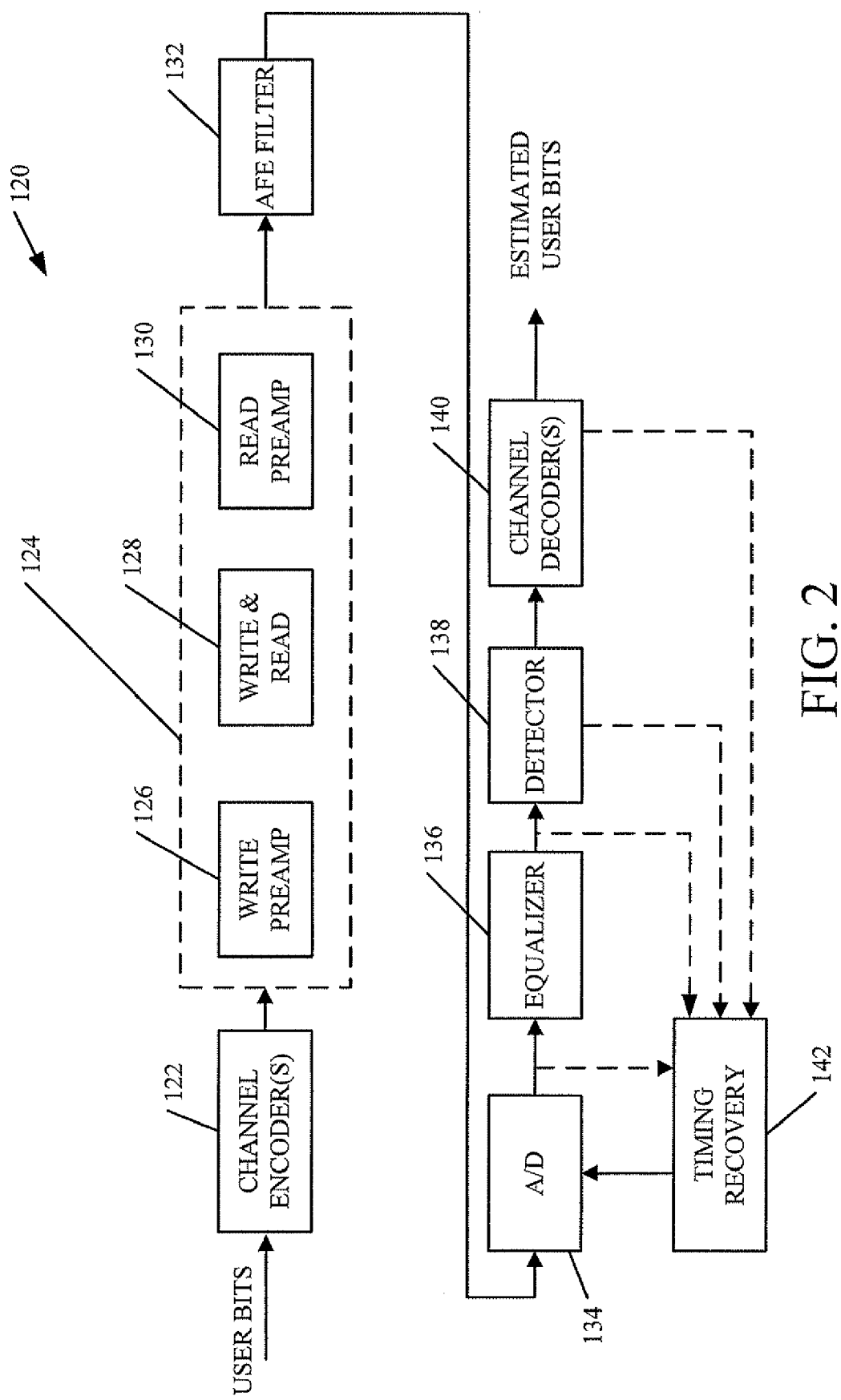
FIG. 2 is a block diagram of one illustrative embodiment of a communication channel of the prior art.

FIG. 2 is a block diagram of one conventional storage system 120. System 120 includes one or more channel encoders 122, communication channel (or storage system) 124 that, itself, includes write preamplifiers 126, write and read transducers and storage media 128, and read preamplifiers 130. System 120 also includes an analog front end (AFE) filter 132, analog-to-digital converter 134, equalizer 136, detector 138, one or more channel decoders 140, and timing recovery component 142. User bits are first input to channel encoders 122 where they are encoded with channel codes (such as modulation codes, inner and outer error correction codes, etc.). The encoded bits are then conditioned, such as amplified by a write preamplifier 126. The bits are then written on the recording medium by using transducers, such as magneto resistive transducers in a magnetic storage system. Up to this point processing of the user bits is referred to as the write process.

In order to recover the data written to the storage medium, a read process is used. In the read process, a read transducer, located in block 128, accesses the desired information stored on the storage media and obtains a noisy readback signal corresponding to the user bits encoded on the storage media. The output signal magnitude at the read transducer 128 is then amplified by read preamplifier 130, before the signal is sent to the remainder of the read channel.

The amplified noisy analog signal is then sent to the read channel architecture to be first processed by analog front end (AFE) filter 132. Filter 132 filters various components out of the read signal and the signal is then digitized by analog-to-digital (A/D) converter 134. A/D converter 134 (also referred to as a sampler) is controlled by timing recovery component 142. Component 142 estimates the sampling instances using any combination of the input signals shown in FIG. 1.

Once the signal is digitized, it is then equalized by equalizer 136. The equalizer output is sent to detector 138 which detects the encoded bit stream in the equalized signal. Finally, the encoded bit stream is sent to channel decoder 140 which decodes the encoded signal to extract the user information and provides an estimation of the user bits that were originally input to the system.

For any given areal density target on the storage media, the purpose of the read channel architecture is to extract the user information with an acceptable error rate (performance), under worst case system imperfections (under worst case reliability) for a given maximum allowable power and complexity (given a maximum cost). When the system areal density is increased, the complexity and power of the read channel architecture, and hence the cost of the read channel architecture, is increased for any given specified performance and reliability targets.

Figure 3:
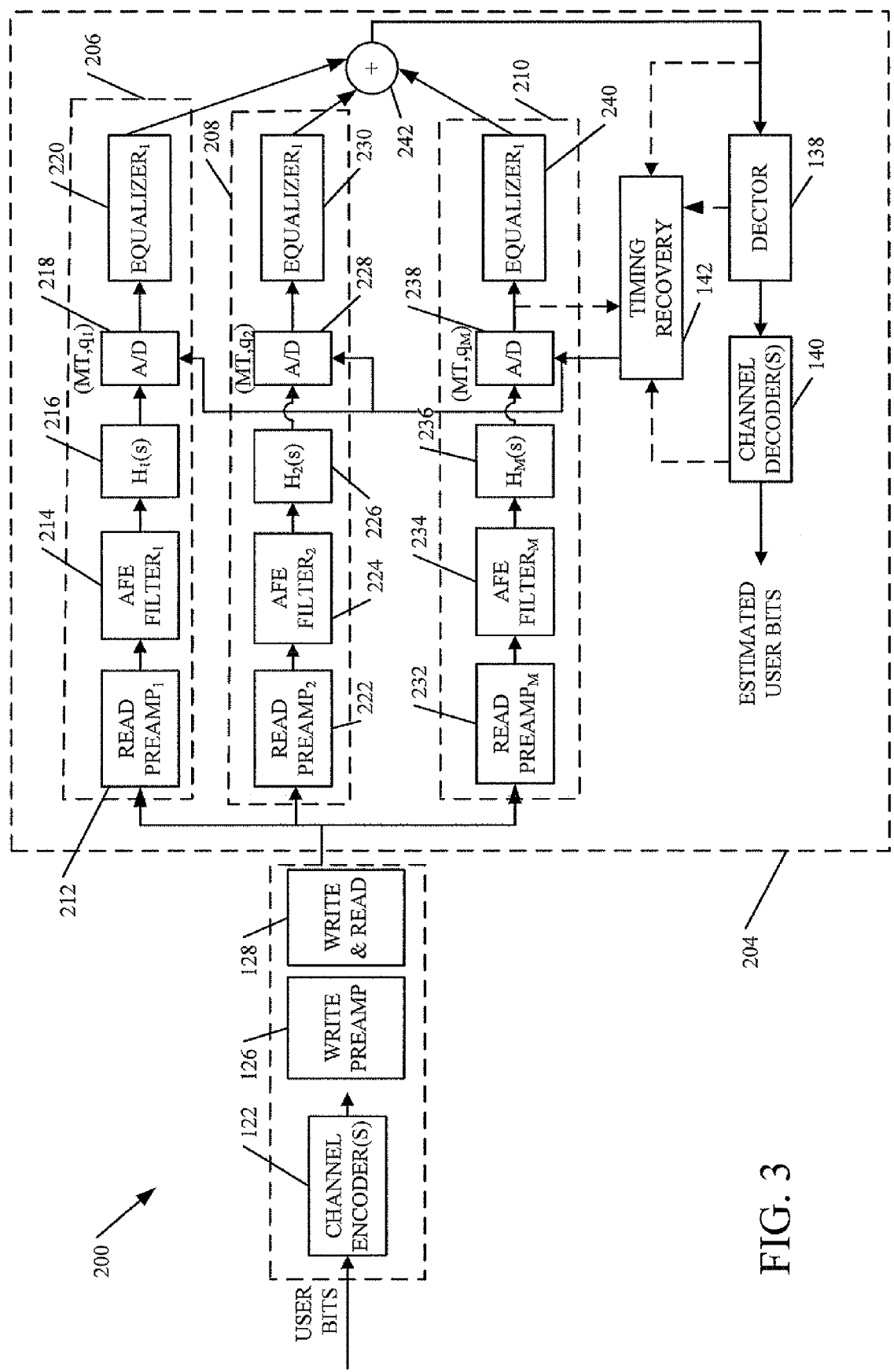
FIG. 3 is a block diagram of one illustrative embodiment of a communication system in accordance with one embodiment.

FIG. 3 is a block diagram of a general case of a read channel architecture in accordance with one embodiment, that allows areal densities to be increased while maintaining relatively low power and complexity, or allows the power and complexity to be decreased for a given areal density. FIG. 3 shows system 200 that includes input and write components 202 and read channel architecture 204. Input and write components 202 are the same as those shown in FIG. 2, and are similarly numbered. It will be noted, as in FIG. 2, components 122, 126 and 128 form a single magnetic recording channel that encodes and records user bits on storage media. In other words, the write process is the same in FIG. 3 as that described above with respect to FIG. 2.

The read process, however, is different. In the embodiment shown in FIG. 3, a read transducer 128 accesses the data stored on the storage medium and obtains a noisy readback signal corresponding to the encoded user bits written on the storage medium. This is also similar to the process described with respect to FIG. 2. However, from that point on, read channel architecture 204 is somewhat different. Read channel architecture 204 includes a plurality (1-M) of signal processing branches labeled 206, 208 and 210 in architecture 204. Branches 206-210 may have different signals and impurity spectra, sampled by slower samplers, and processed by different digital blocks. While the branches 206-210 all include similar components in the embodiment shown in FIG. 3, that need not be the case, as will be described below. For the sake of the present explanation, however, it will be assumed that each branch 206-210 has similar blocks. Each has a read preamplifier 212, AFE filter 214, hybrid filter 216, A/D converter 218 and equalizer 220. Similar blocks in branches 208 and 210 are labeled 222-240, respectively.

The output of all of the equalizers 220, 230 and 240 is provided to summing node 242. The signal from each equalizer is combined at node 242 to form an output signal y(n) which is then provided to detector 138 and optionally to timing recovery component 142.

The read channel architecture 204 shown in FIG. 3 is very flexible. For instance, architecture 204 can be modified to have only a single preamp component (such as preamp 130 in FIG. 2) but to have multiple A/D samplers 218, 228 and 238 whose outputs are then combined to be processed by a single branch of digital blocks 220, 230 and 240. Similarly, architecture 204 can be modified to have only a single preamp 130, and a single A/D sampler (such as A/D sampler 134 in FIG. 2) but with multiple branches for digital processing (such as multiple equalizers 220, 230 and 240). Different exemplary embodiments of implementing read channel architecture 204 are described below with respect to FIGS. 4, 5, 7, and 10-12, and others could be used as well.

Figure 4:
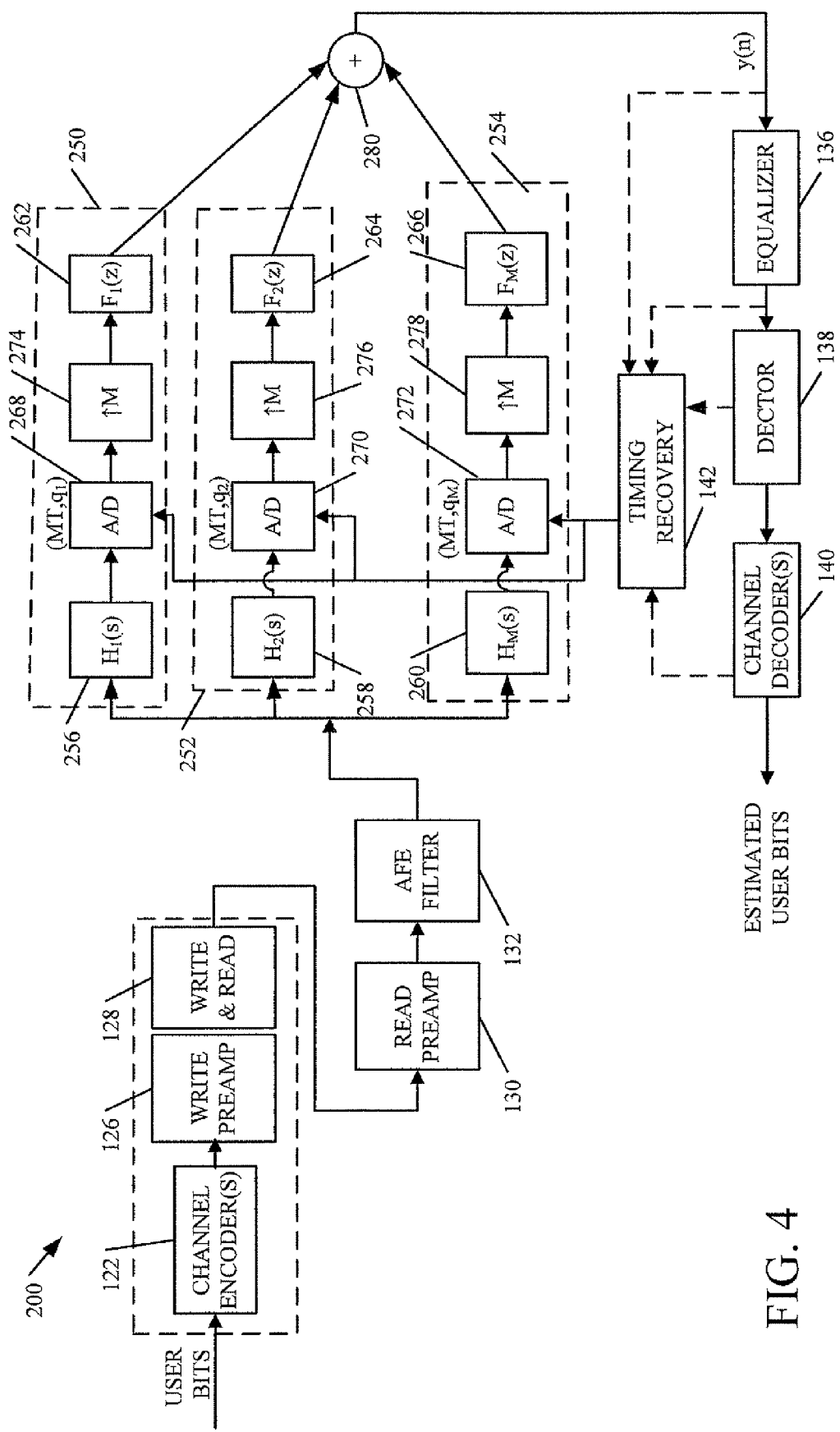
FIG. 4 is a block diagram of one specific architectural implementation of the system shown in FIG. 3.

FIG. 4 shows one exemplary implementation of architecture 204 shown in FIG. 3. In FIG. 4, the architecture 204 is modified so that write preamps 126, read/write transducers and channel 128 and read preamp 130, along with AFE filter 132, are the same as those shown in FIG. 2. However, the readback signal is sampled, after AFE filter 132, using a hybrid filter bank architecture shown in FIG. 4. Instead of having a single A/D converter (or sampler) 134 as shown in FIG. 2, the architecture shown in FIG. 4 has a plurality of sampler branches 250, 252, and 254. Branches 250-254 have a set 299 of analysis filters 256, 258, and 260, along with a set 301 of synthesis filters 262, 264 and 266. Each branch 250-254 also has an A/D converter 268, 270 and 272 and up sampling blocks 274, 276 and 278. The outputs of the synthesis filters 262-266 are provided to a combining node 280 where the signals are combined into an output signal y(n) which is provided to equalizer 136.

In the embodiment shown in FIG. 4, the analog signal provided by AFE filter 132 is sampled every T seconds. However, by replacing just the single A/D sampler 134 (in FIG. 2) which operates at the full sampling frequency T of the system, with a hybrid filter bank architecture such as that shown in FIG. 4, which employs M samplers 268-272, each operating at 1/Mth of the sampling frequency of the system, a number of significant advantages can be derived. The sampling frequency of the A/D samplers 268-272 are M times slower than the single A/D sampler 134 shown in FIG. 2. This reduces the complexity of the A/D filter blocks exponentially. Similarly, for sufficiently low sampling frequencies, sampling can be performed using more power efficient sampler architectures which are currently known (such as sigma-delta architectures). In addition, the quantization level of A/D components 268-272, in each branch 250-254, is based on user information, noise power, distortion, and non-linearity modes of the noisy signal at each branch and can thus be changed on a branch-to-branch basis to reduce the complexity of the system.

Figure 5:
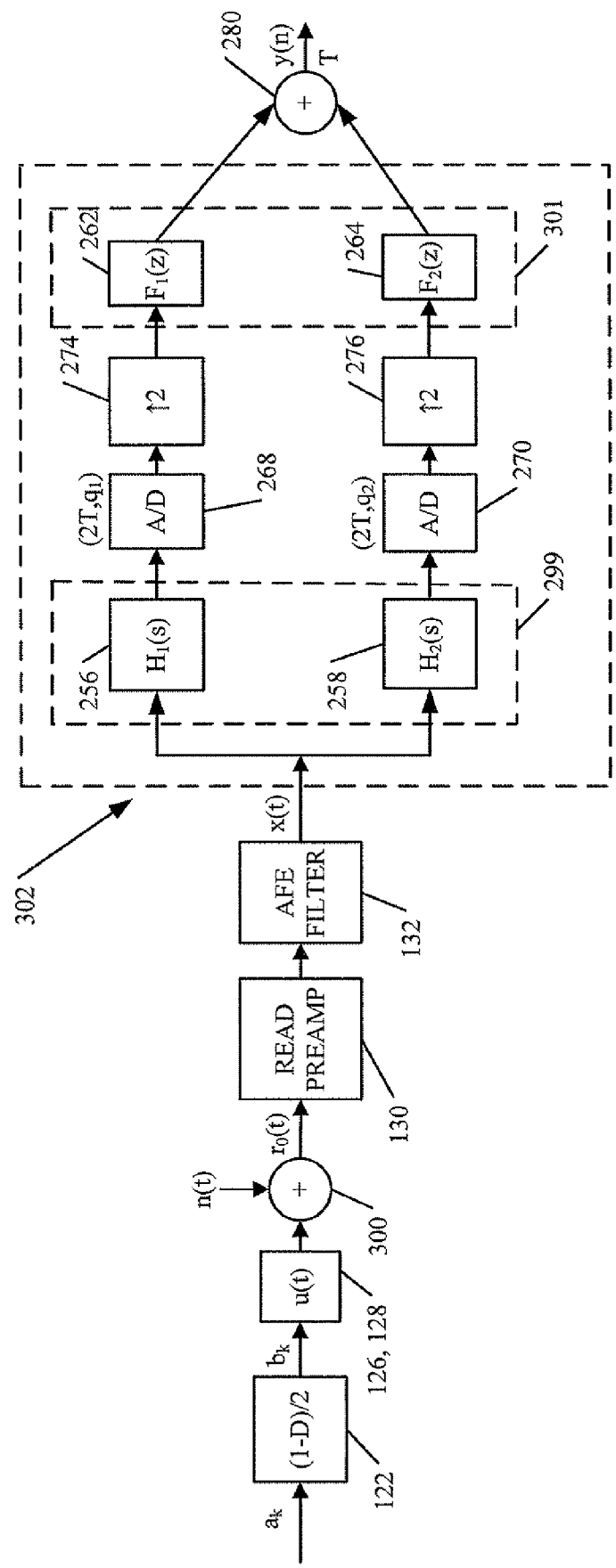
FIG. 5 illustrates a two-branch implementation of the architecture shown in FIG. 4.
Figure 6:
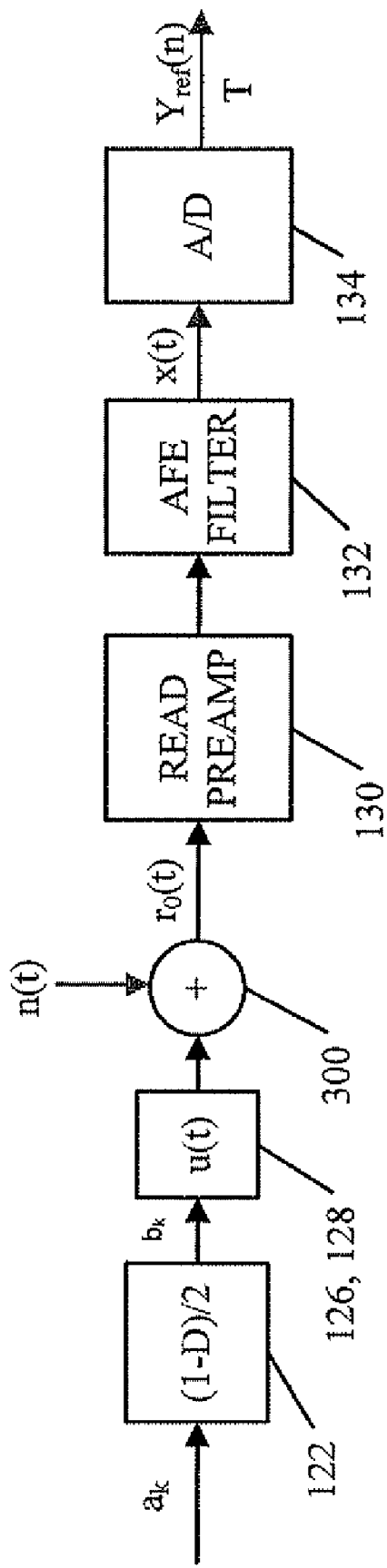
FIG. 6 is a block diagram of a conventional magnetic recording channel used in the prior art.

A specific example of the architecture shown in FIG. 4 will now be described. FIG. 5 shows a two-branch version of the architecture shown in FIG. 4. FIG. 5 will be described in contrast to a conventional read channel sampling architecture shown in FIG. 6. In FIG. 5, those items that are similar to those shown in FIG. 4 are similarly numbered. It will be noted that both in FIGS. 5 and 6 encoder block 122 receives user bits labeled $a_k$ and applies an illustrative function $(1-D)/2$ to obtain an encoded signal $b_k$. The channel transition response u(t) is exhibited in write preamp and write transducer and media 126-128, respectively. The readback signal, generated by the read transducer, has additive noise n(t) added to it and this is represented by summing node 300. The noisy readback signal is labeled $r_0(t)$ and is provided to read preamplifier 130. In FIG. 5, after being amplified by preamp 130 and filtered by filter 132, the input signal x(t) is provided to the hybrid filter bank architecture 302. FIG. 6 shows a conventional read channel architecture, from the input $a_k$ through the output of sampler (A/D) converter 134. It will be noticed that the difference is that the hybrid filter bank 302 shown (in FIG. 5) replaces the A/D sampler 134 (in FIG. 6).

Figure 5A:
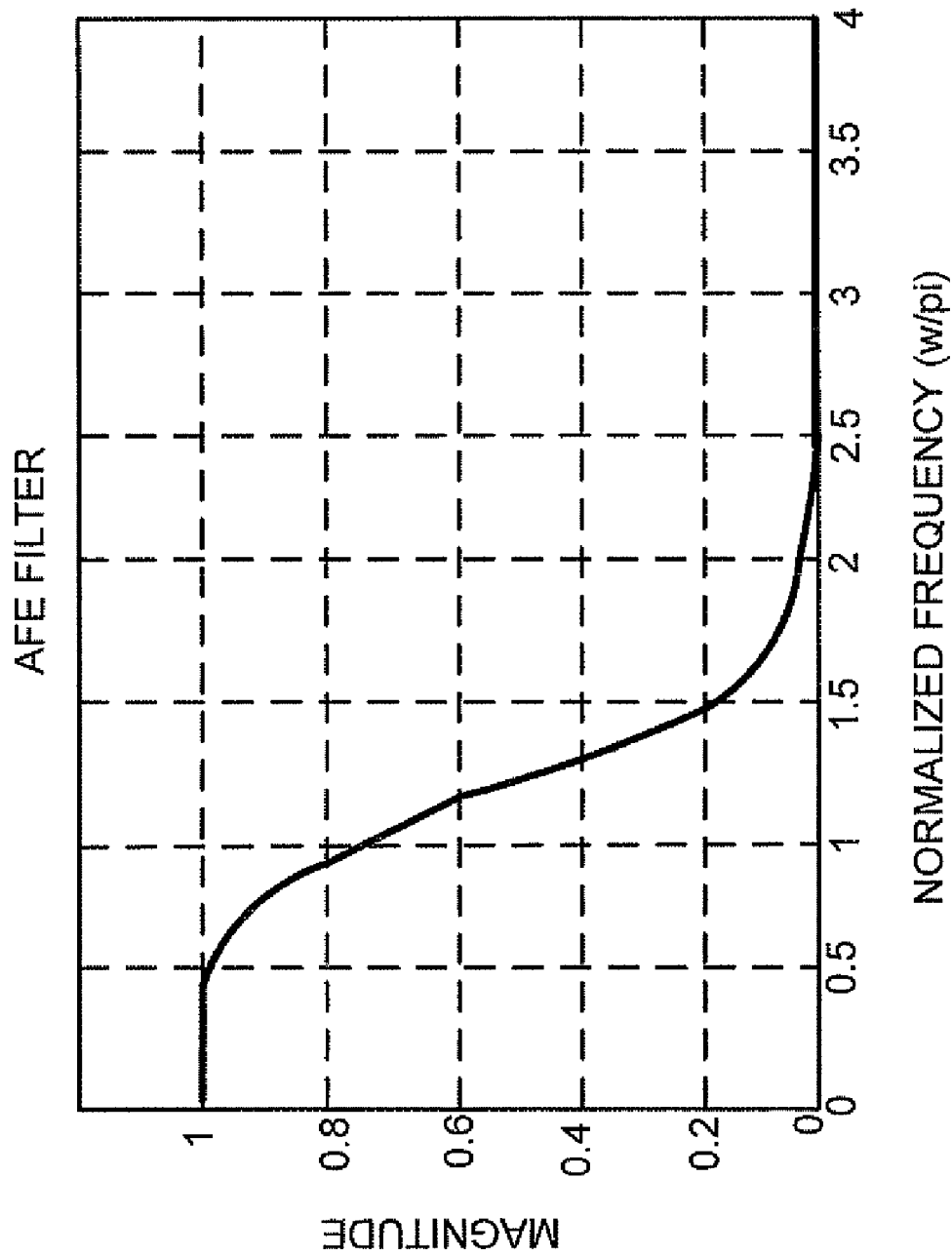
FIG. 5A is a plot of a frequency response of an analog front end (AFE) filter.

The effect on the complexity of the system, given the analog analysis filter bank 299 and synthesis filter bank 301, will first be discussed. For the sake of discussion, it is assumed that AFE filter 132 is a seventh order Butterworth filter that has a magnitude of its frequency response shown in FIG. 5A. FIG. 5A shows that AFE filter 132 is a simple analog low pass filter which as a cutoff frequency at the sampling clock frequency. Filter 132 is primarily used to eliminate aliasing in the system by limiting the band of its input signal. It will also be assumed, for the sake of this discussion, that there is no preamplifier affect (that is the preamplifier is an all-pass filter with zero phase response) that there is no noise in the system (that is, no electronic and jitter noise), and that the A/D samplers have an infinite resolution (that is the signal is still discrete and not yet quantized). It will also be assumed that analysis filters 256 and 258 in analysis filter bank 299 are finite impulse response (FIR) filters with order N. These analysis filters are generally known as quaduriture mirror filters (QMF) and their synthesis filters 262 and 264 in synthesis filter bank 301 can be chosen as follows:

$$f_1(n) = h_1(N-n),$$

$$f_2(n) = (-1)^n h_1(n) \qquad \text{Eq. 1}$$

For a third order discrete-time filter $H_1(z)$ and applying Daubechies' methodology by constraining $H_1(z)$ by enforcing all the derivatives to be 0 at $\omega=0$, the following can be obtained.

$$h(0) = \frac{1-\sqrt{3}}{4\sqrt{2}} \qquad \text{Eq. 2}$$

$$h(1) = \frac{3-\sqrt{3}}{4\sqrt{2}}$$

$$h(2) = \frac{3+\sqrt{3}}{4\sqrt{2}}$$

$$h(3) = \frac{1+\sqrt{3}}{4\sqrt{2}}$$

The coefficients of the other filters within the filter bank architecture can be found using the equations set out in Eq. 2.

Next, an appropriate discrete-time to continuous-time (i.e., from z-transform to s-transform) transformation G(s) is found. G(s) converts a discrete-time filter H(z) into a continuous-time filter H(s), whose frequency response $H(j\omega)$ accurately approximates that of a discrete-time filter $H(e^{j\omega})$ within the integral $-\pi \leq \omega < \pi$. This transformation can be written as a ratio of polynomials in s as follows:

$$z^{-1} = G(s) = \frac{G_B(s)}{G_A(s)} \qquad \text{Eq. 3}$$

An example of such a transformation is given by:

$$G_1(s) = \frac{s^2 - 5s + 10.3}{s^2 + 5s + 10.3} \qquad \text{Eq. 4}$$

An approximation can be made to Eq. 4 by increasing the order of the transformation from 2 in Eq. 4 to, for example, the $4^{th}$ order as given by:

$$G_2(s) = \frac{s^4 - 18.8s^3 + 166s^2 - 711s + 1543}{s^4 + 18.8s^3 + 166s^2 + 771s + 1543} \qquad \text{Eq. 5}$$

Also, it is assumed that the isolated transition response of the longitudinal recording channel (usually known as a Lorenzian pulse) is given by:

$$u(t) = \frac{K}{1 + \left(\frac{2t}{PW_{50}}\right)^2} \qquad \text{Eq. 6}$$

Where K is a scaling constant and $PW_{50}$ indicates the width of the Lorenzian pulse at half of its peak value. Similarly, the transition response for a perpendicular recording channel is given by:

$$u(t) = \text{erf}\left(\frac{2t\sqrt{\ln 2}}{PW_{50}}\right) \qquad \text{Eq. 7}$$

Where erf(.) is an error function which is defined by:

$$\text{erf}(x) = \frac{2}{\sqrt{\pi}} \int_0^x e^{-t^2} dt \qquad \text{Eq. 8}$$

and $PW_{50}$ determines the width of the derivative of the transition response g(t) at half its maximum. The channel in FIG. 6 will be assumed to have a channel response u(t) as given in Eq. 7 within $ND=PW_{50}/T$ equal to 2, wherein the ND ratio represents the normalized recording density which defines how many data bits can be packed within the resolution unit $PW_{50}$, and the dibit response is defined $h(t)=u(t)-u(t-T)$. In other words, with ND=2, the $PW_{50}$ is equal to twice the desired sampling period shown in the prior read channel architecture of FIG. 6. The magnitude of the error (the difference between $y_{ref}(n)$ in FIG. 6 and y(n) in FIG. 5) using the analysis filter set obtained by applying the transformation shown in Eq. 4 is much larger than the one obtained by applying the transformation shown in Eq. 5. One has a standard deviation of around 0.013 which corresponds to 37.8 dB signal to noise ratio (SNR) using the definition below:

$$SNR = 10\log \frac{V^2}{\sigma_e^2} \qquad \text{Eq. 9}$$

Where $\sigma_e^2$ is the electronic noise power in the pass band region of the filter, and $V^2$ is normalized to 1. The other has a standard deviation of approximately 0.0007 which corresponds to 63 dB SNR. This improvement comes with an increase in implementation costs as the analysis filters obtained using Eq. 5 have an order 12 while the other set have an order of 6.

Now the quantization level (the bit resolution of the A/D sampler shown in FIG. 6) will be analyzed as it relates to the system parameters, such as channel normalized density (ND), electronic noise amount $\sigma_e$, and the jitter noise amount $\sigma_j$. Again, it will be assumed for the sake of this analysis that the read preamplifier effect is 0 (i.e., the preamplifier is an all-pass filter with 0 phase response). For a variety of different combinations of ND, $\sigma_e$ and $\sigma_j$ values, a quantization level q=7 in FIG. 6 (which means 7 bit resolution at the output of A/D converter 134 wherein 1 bit is for the sign and 6 bits are for the signal amplitude) results in approximately 45 dB SNR equivalent quantization noise level. This is small enough to have a minimal affect on system performance.

Now, however, compare the architecture in FIG. 5 with the reference architecture in FIG. 6. The reference architecture has an A/D sampling every sampling period T and has 128 quantization levels (i.e., the output of the sampler of the A/D sampler 134 can be represented with a 7 bit register). With the quantization levels q1 and q2 for the A/D converters 268 and 270 shown in FIG. 5 also chosen to equal 7, the system provides approximately 45 dB SNR equivalent quantization noise level for the same variety of combinations of ND, $\sigma_e$ and $\sigma_j$ which were tried for the conventional architecture shown in FIG. 6. While this does not gain in terms of the effective quantization levels, it still reduces the complexity because the two samplers 268 and 270 are operating at half the sampling frequency and are therefore less complex than a single A/D sampler 134 operating at full sampling frequency, since the complexity of samplers increases exponentially with sampling frequency. Therefore, simply by providing the architecture shown in FIG. 5, significant reduction in complexity can be obtained over that shown in FIG. 6, for the A/D samplers 268 and 270.

It will also be noted, however, that the values of q1 and q2 for A/D samplers 268 and 270 in FIG. 5 can be reduced for some system parameters. For instance, it has been seen that the signal being processed has a very small component left at the spectrum of the $H_2(s)$ filter 258 where ND is equal to 3. This means that a smaller value of $q_2$ for A/D sampler 270, can be chosen. In one specific embodiment, $q_2$ is chosen to be 6 instead of 7. This still provides approximately 44 dB SNR equivalent quantization noise level, and this is still small enough to have minimal affect on the system performance, while reducing the system complexity (because the quantization level q2 has been reduced).

Figure 5B:
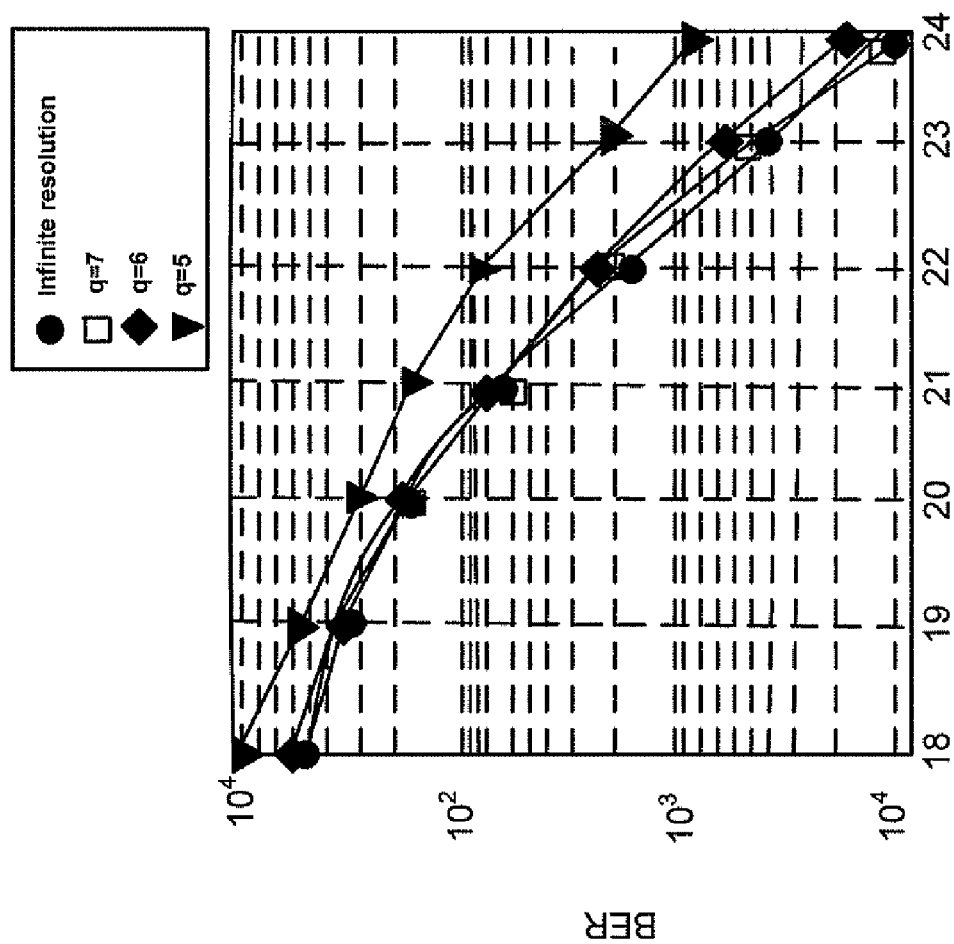
FIGS. 5B and 5C show plots of bit error rate versus signal-to-noise ratio.
Figure 5C:
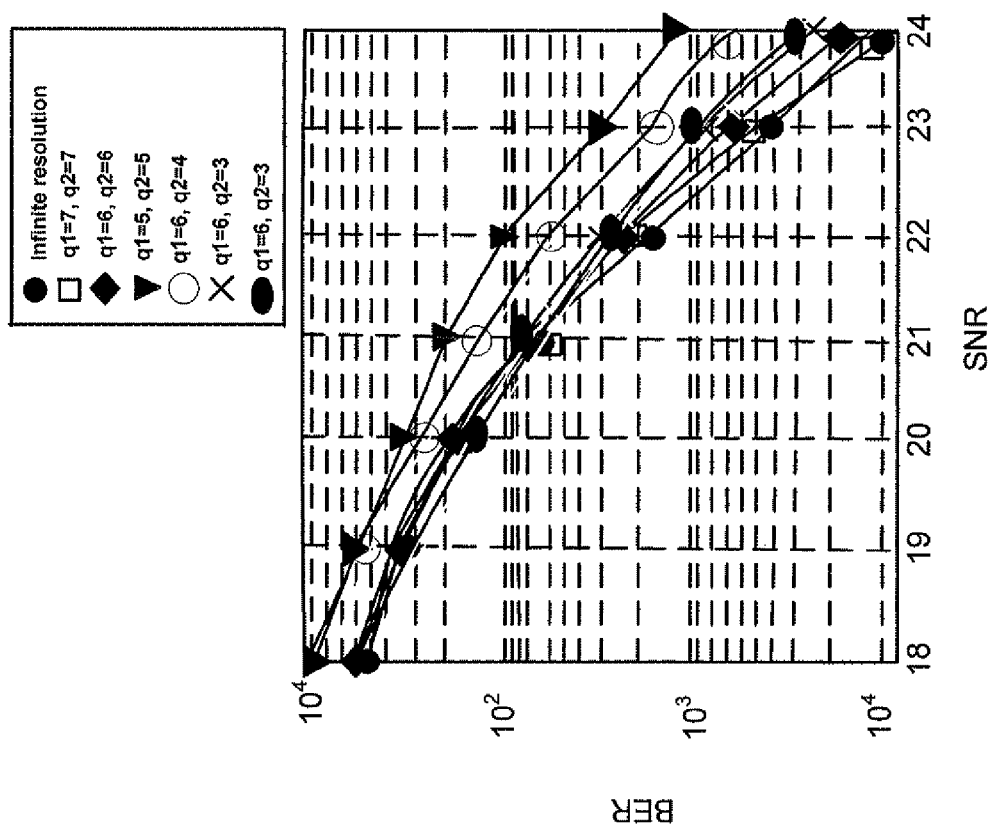

In addition, in a real world environment, the specific filter pass band will likely be corrupted by noise and therefore the quantization q2 can be further reduced based on the specific detection and decoding algorithms that follow the sampler 270. For instance, for a PRML detection algorithm that has a 21 tap equalizer, equalizing the channel to a programmable target of length 5, followed by a Viterbi detector, the bit error rate versus SNR performance plots at ND equal to 3, corrupted only by electronic noise, are shown in FIGS. 5B and 5C. FIG. 5B shows the plot for the conventional architecture shown in FIG. 6, while FIG. 5C shows the plot for the architecture described with respect to FIG. 5. The plots are for a variety of different A/D sampler quantization levels.

It can be seen that reducing the resolution of A/D sampler 134 in the conventional architecture of FIG. 6 to six bits can be done without significantly affecting the performance of the system. However, if the quantization level is reduced to five bits, significant performance is lost. The same behavior can be observed for the architecture shown in FIG. 5, if both q1 and q2 are chosen to be the same levels. However, they need not be. Instead, the architecture of FIG. 5 provides additional flexibility such that the effective quantization level can be reduced by only reducing the quantization level q2. For example, by choosing q1 and q2 as the quantization levels for samplers 268 and 270 to be 6 and 4, respectively, the effective quantization level of the system is still 5, and the performance of the system is much better than choosing q1 and q2 both to be equal to 5 (which is equivalent to choosing the quantization level of sampler 134 in FIG. 6 to be five).

In fact, q2 can be further reduced. For example, choosing q2 to be equal to 3 provides very comparable performance while the effective quantization level of the system is reduced to 4.5, overall. Similarly, q2 can be chosen to be 2 if the performance loss is acceptable. In that instance, the effective quantization level of the system is equal to 4, and the performance of the architecture shown in FIG. 5 at this quantization level is much better than the performance of the architecture show in FIG. 6 when the quantization level q of the single A/D sampler 134 is chosen as 4.

It will also be noted that the system behavior changes with the real channel. For instance, if ND is changed to 1.5 from 3, the behavior of the conventional architecture shown in FIG. 6 and the architecture shown in FIG. 5 will change as well. The quantization levels q1 and q2 can then be chosen accordingly, given those circumstances.

Thus, in general, the architecture shown in FIG. 5 provides extra flexibility to choose the quantization values for samplers 268 and 270 (q1 and q2) for a given system with its noise, distortions, non-linearities, etc. This leads to a reduction in the complexity of the samplers without making the quantization noise be the dominant imperfection in the system, and without significantly affecting the overall performance of the system.

Figure 7:
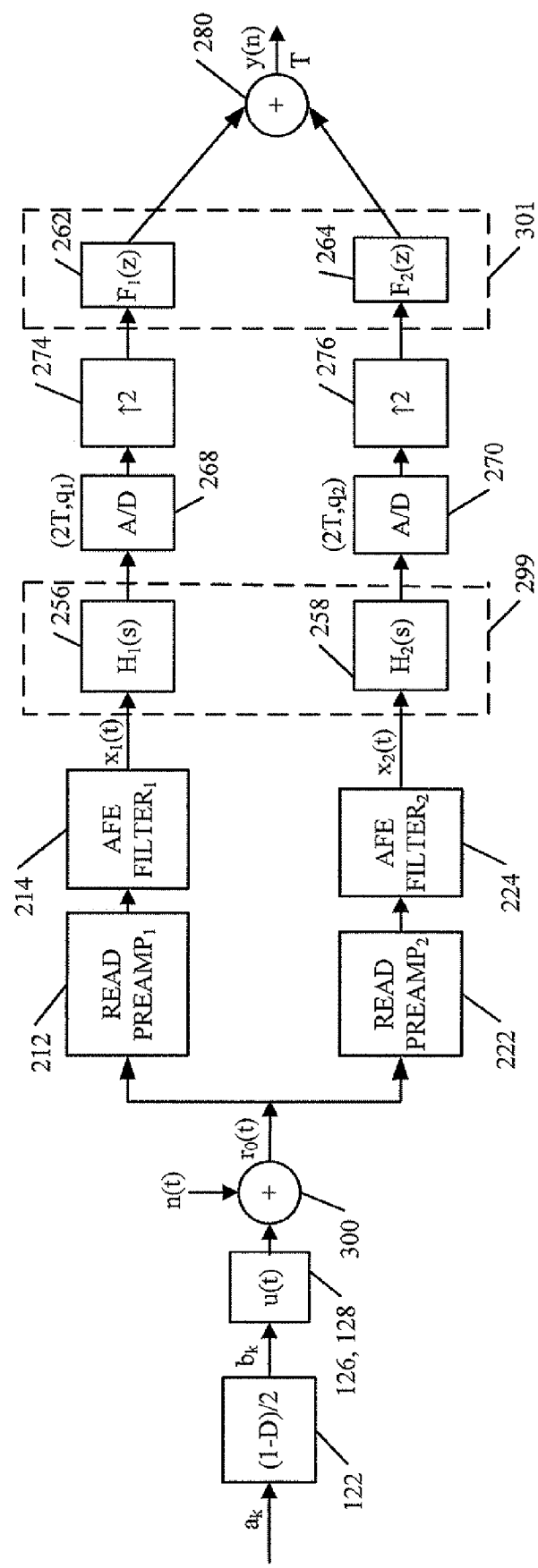
FIG. 7 is a block diagram of one illustrative embodiment of a two-branch implementation of the architecture shown in FIG. 3.

FIG. 5 above focuses on only analog-to-digital sampler (A/D block 132) and utilized a hybrid filter bank architecture to reduce the cost of such a system. However, the same type of technology can be applied to read preamplifier 130 and analog front end (AFE) filter 132 in order to reduce the complexity of those functions as well. FIG. 7 shows another channel architecture in which not only is A/D component 134 replaced by the two branches (previously shown in FIG. 5), but read preamplifier 130 and AFE filter 132 are now replaced by read preamplifiers 212 and 222, and AFE filters 214 and 224, respectively. Of course, the cost functions and transfer functions of the preamplifiers are incorporated into designing the appropriate analysis and synthesis filter banks 299 and 301, respectively.

By providing multiple preamplifiers and AFE filters in the processing branches, a number of additional advantages are obtained over and above those found in the architecture shown in FIG. 5. Complexity of preamplifier circuits is exponentially reduced by relaxing the cutoff frequency and passband constraints. By increasing the number of preamplifiers in the system, in order to relax those constraints, the system has multiple, relatively simple, preamplifiers as compared to a system having one, very complex preamplifier, with very tight cutoff and passband constraints. The affect of the passband and cutoff frequency constraints on complexity becomes even more pronounced as data rate increases. Therefore, the overall complexity of the preamplifier operation in the architecture shown in FIG. 7 is reduced over that shown in FIG. 5, because multiple preamplifiers 212 and 222 are provided instead of the single preamplifier 130.

In addition, the complexity of preamplifiers 212 and 222, in each branch, can be further reduced and optimized considering the noise level of the preamplifier together with the signal and impurities (such as noise, distortions, and non-linearities) in the system at the specific branch and the specific quantization level of the sampler used in that branch. In a similar way, the complexity of the APE filters 214 and 224 is also reduced as the constraints in the processing branch are relaxed.

More specifically, consider again read preamplifier 130 shown in FIG. 6. For conventional trans-resistant preamplifier designs for a given acceptable preamplifier SNR and gain factor, the signal bandwidth cannot be increased as much as desired, because after some point, the preamplifier 130 becomes unstable. This requires either a more complex design or a more expensive process to design the circuitry, or both. These increase the overall system cost. Conventional preamplifier 130 also has highpass poles which filter out low frequency content of the input signal. However, in some recording architectures, such as perpendicular recording, useful user information is provided at low frequencies and requires preamplifier designs with small highpass poles. This places an extra constraint on the design of preamplifier 130 which, again, becomes even more pronounced with increase in signal bandwidth (i.e., system throughput).

The same can be said for the AFE filter block 132. Having a constant ripple during its passband, while maintaining a sharp lowpass cutoff at higher signal bandwidths, requires a more costly design.

Each processing branch in FIG. 7 will now be considered, in conjunction with the frequency response of the filters $H_1(s)$ and $H_2(S)$ in analysis filter bank 258. In one embodiment, $H_1(s)$ is designed such that it exhibits a lowpass behavior between 0 and $\pi$ with a cutoff frequency at $\pi/2$. Lowpass AFE filter 214 with cutoff frequency at $\pi/2$ is sufficient to filter out the unpredictable behaviors of $H_1(s)$ beyond $\pi/2$. This reduces the required bandwidth of filter 214 from $\pi$ (which it would be in the prior art system of FIG. 6) to $\pi/2$, which reduces the cost of filter 214. In the first branch preamplifier 212 is also needed, which is required to amplify the signal components between 0 and $\pi/2$ with the required reduced highpass pole constraints instead of between 0 and $\pi$ with the same reduced highpass pole constraints (as in FIG. 6). This again results in cost reduction for the preamplifier design.

In the second branch, the analysis filter 258 is designed such that $H_2(s)$ exhibits a highpass behavior between 0 and $\pi$ with a cutoff frequency of $\pi/2$. Thus, a high pass AFE filter 224 with a cut off frequency at $\pi$ is sufficient to filter out the unpredictable behaviors of $H_1(s)$ beyond $\pi$. Behavior of filter 224 at frequencies below $\pi/2$ can be anything, which helps reduce the cost of filter 224. Preamplifier 222 is needed in this branch to amplify the signals with frequency components between $\pi/2$ and $\pi$. This means that its low cutoff frequency requirement does not need to be very tight, because this pole can be as high as $\pi/2$ which increases the yield of the preamplifiers, thus reducing the cost.

Figure 8A:
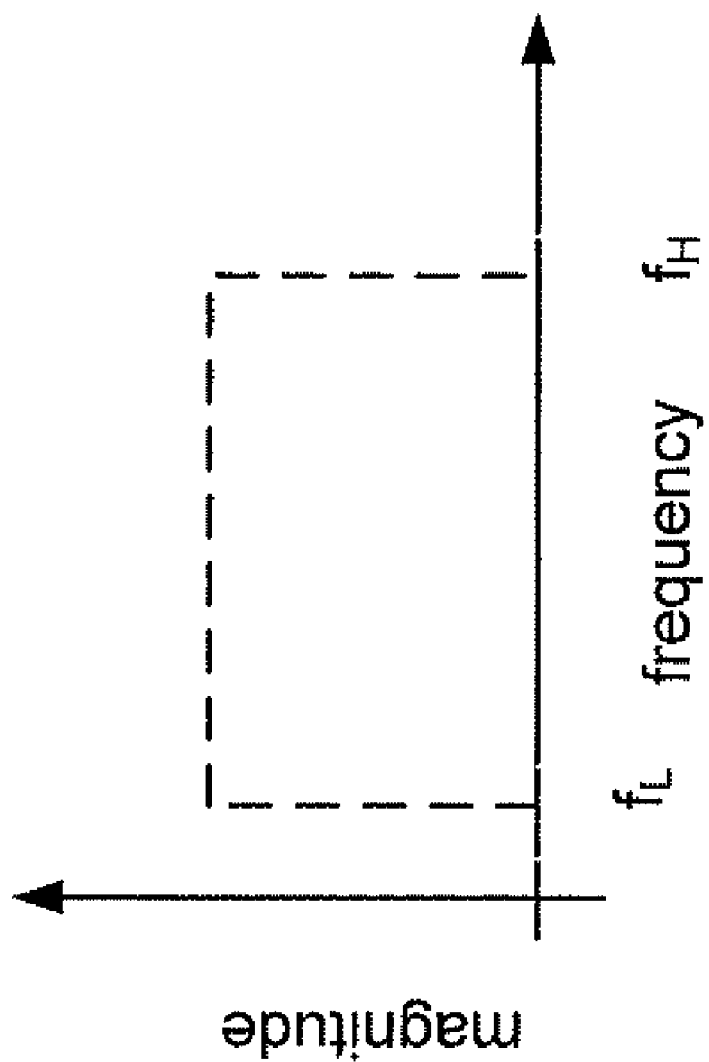
FIGS. 8A and 8B illustrate a prior art preamplifier response and a desired preamplifier response, respectively.
Figure 8B:
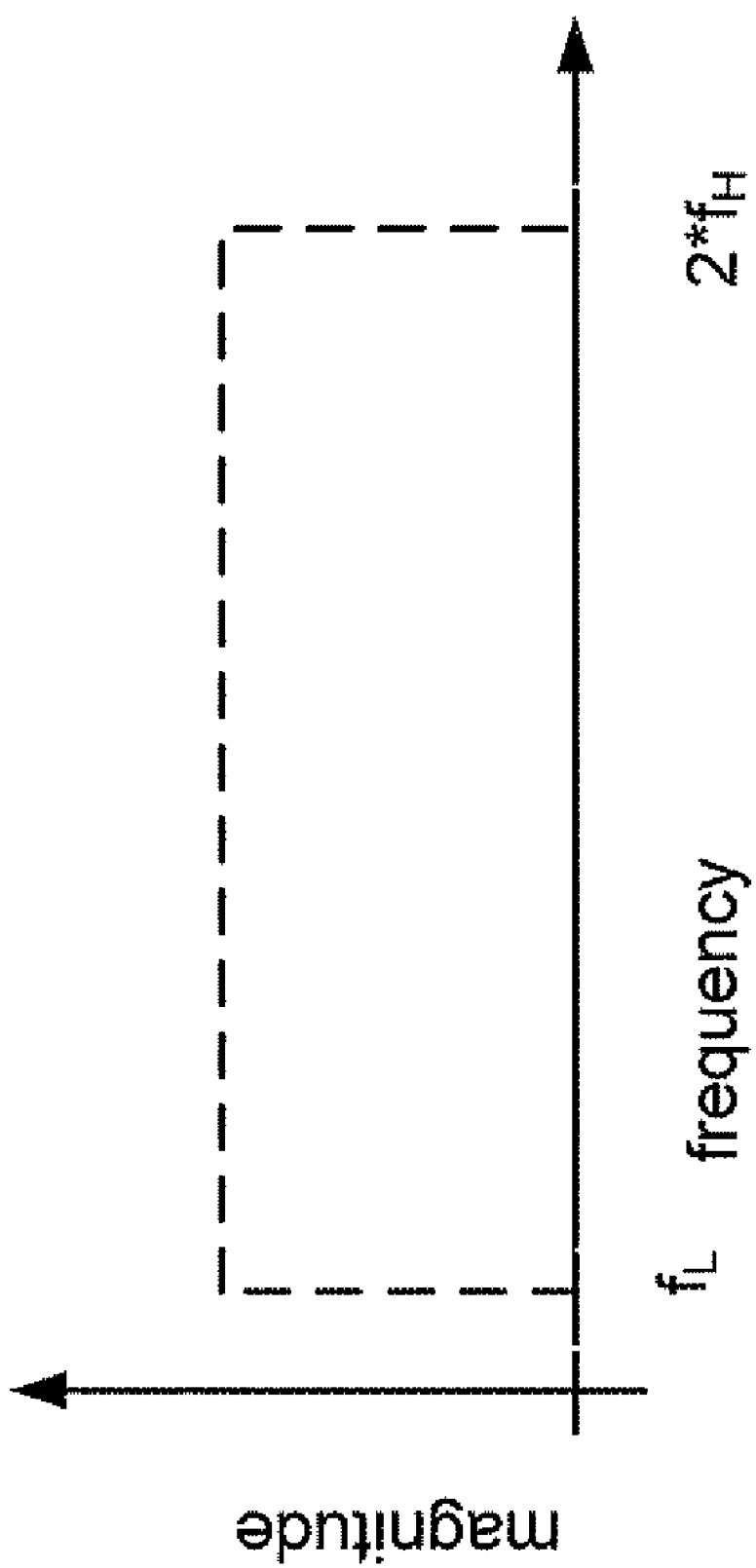

To further illustrate the cost reduction for the preamplifiers 212 and 222, assume that the design of FIG. 7 is done with the desire to double the sampling frequency from $f_H$ to $2 \times f_H$. In that case, a preamplifier design with a conventional frequency response (shown in FIG. 8A) that is designed for a system with a sampling frequency of $f_H$, is inadequate. Instead, a preamplifier with a frequency response of $2 \times f_H$ (shown in FIG. 8B) is required. The cost of such a preamplifier circuit increases primarily for two reasons. First, the maximum frequency that the preamplifier must support has doubled, which most notably necessitates a more expensive process. Second, the bandwidth has increased as well, and the yield of the preamplifier production will be reduced because having a stable design with the predefined preamplifier SNR and gain factor becomes more difficult to satisfy.

Figure 9A:
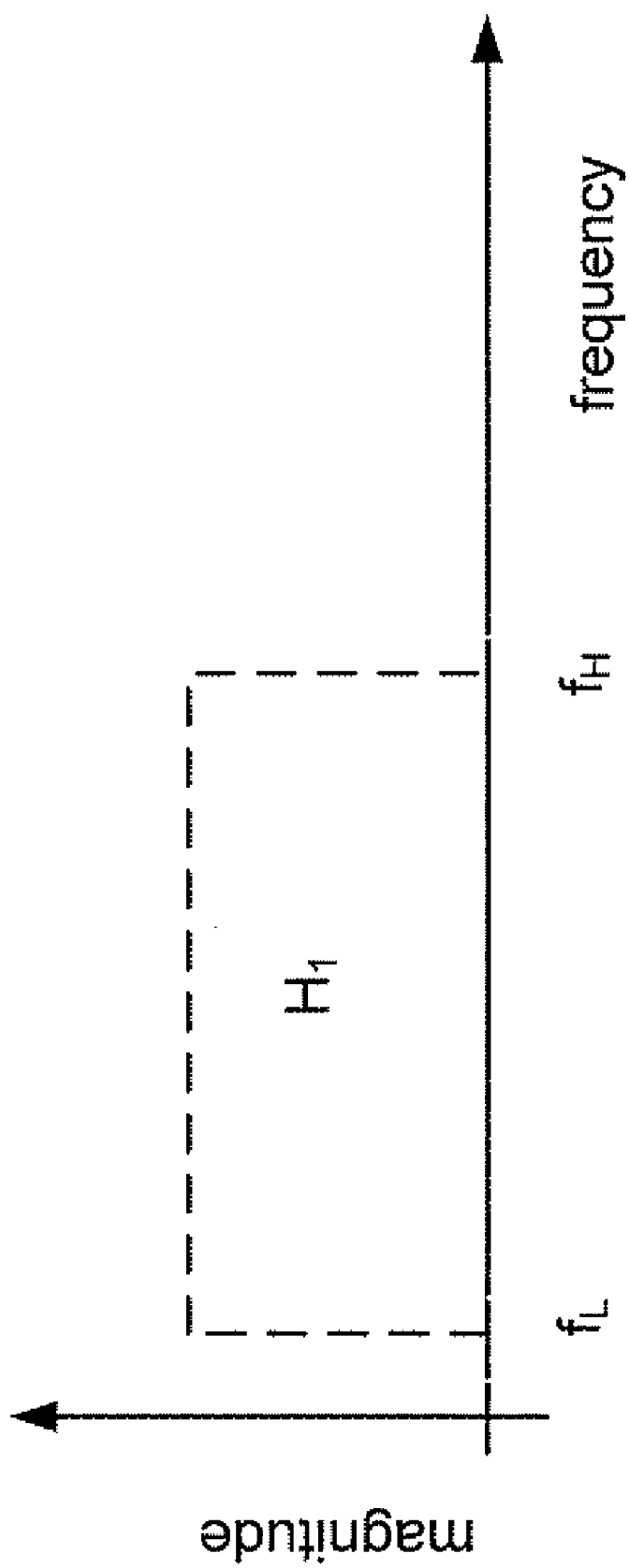
FIGS. 9A and 9B illustrate preamplifier response for a first and second preamplifier, in accordance with one embodiment.
Figure 9B:
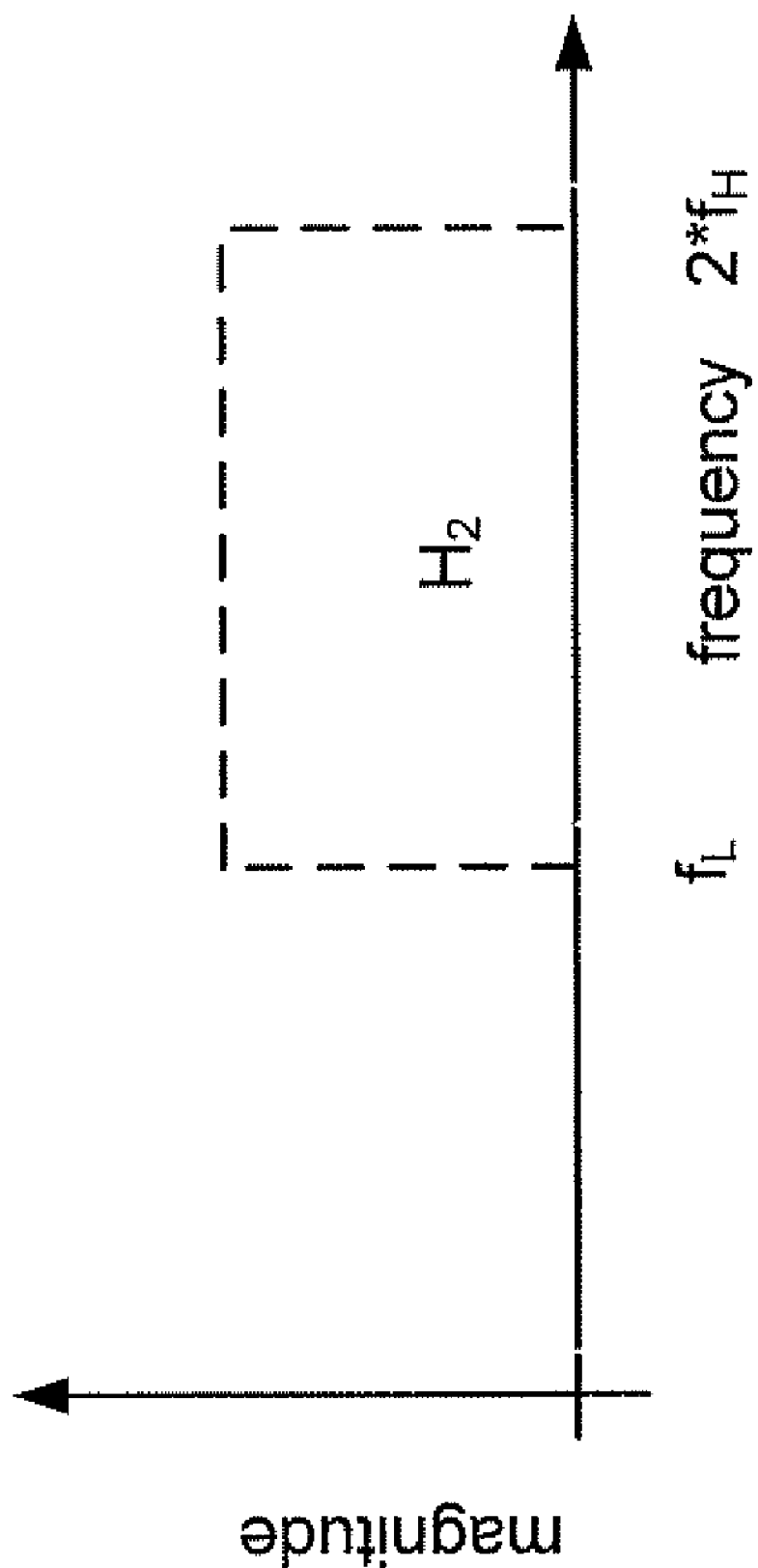

For the architecture shown in FIG. 7, on the other hand, the frequency responses for preamplifiers 212 and 222 is shown in FIGS. 9A and 9B, respectively. As seen in FIG. 9A, preamplifier 212 for $H_1(s)$ is the same as the preamplifier response in the conventional system (shown in FIG. 8A). There is no need for anymore expensive process than is already being used, in order to obtain this preamplifier. In fact, the existing process provides acceptable circuitry, with acceptable yield figures. On the other hand, the preamplifier 222 for $H_2(s)$ requires a more expensive process. However, the low frequency cutoff value is much higher than that shown in FIG. 8B (or, similarly, the required bandwidth of preamplifier 212 did not increase at all, over that shown in FIG. 8A). This means that the yield of the slightly more expensive process required to manufacture preamplifier 222 will be much higher than the yield of a process required to manufacture a preamplifier having a frequency response shown in FIG. 8B.

Figure 10:
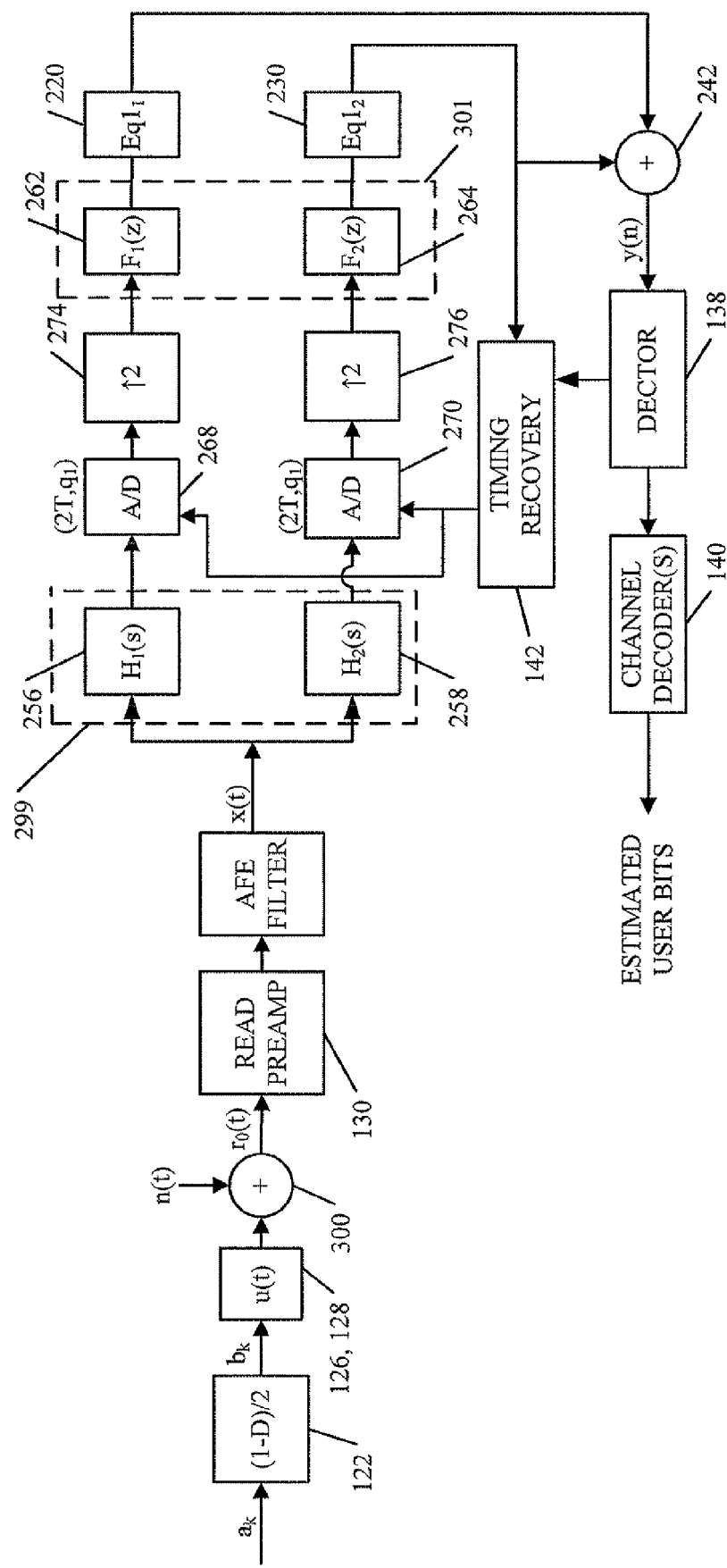
FIG. 10 is a two-branch implementation of another embodiment of the architecture shown in FIG. 3.

FIG. 10 shows yet another embodiment of architecture 204 shown in FIG. 3. The architecture shown in FIG. 10 is similar to that shown in FIG. 5, except that different digital signal processing branches are also provided. The digital signal processing branches include equalizer blocks 220 and 230, respectively. Of course, the architecture shown in FIG. 10 could include multiple preamplifiers and AFE filters, for the single physical channel, as well. However, for the sake of the present discussion, it is shown with a single preamplifier 130 and AFE filter 132.

The architecture shown in FIG. 10 has many of the same advantages described with respect to the other architectures discussed above. However, it also provides some additional advantages. Because there are multiple equalizers 220 and 230 for a given physical channel, these digital domain blocks work at a slower clock rate than those in which only a single equalizer is provided (such as that shown in FIG. 2). This results in a reduction of the overall implementation complexity, and therefore a reduction in cost.

In addition, based on the amount of signal, noise, distortion, and nonlinearities in each branch in the architecture shown in FIG. 10, the required equalization strength for a given performance, hence the number of equalizer taps may differ. Reducing the number of taps for different branches in the architecture shown in FIG. 10 results in an overall reduction in system complexity as well.

Further, the timing recovery circuit 142 has access to the signal samples effectively sampled at every other T seconds, while it controls samplers operating M times slower than the sampling times of the input signal (where M is the number of branches). This means that the architecture of timing recovery circuit 142 has access to more signals between the two consecutive sampling instances of the samplers 268 and 270. This provides more accurate estimation of timing errors in the system, and thus improves the overall system performance and reliability. This increase can, of course, be traded to further reduce the overall complexity of the system.

The amount of information about user data, noise, distortion, and non-linearity components at each branch, will be different. This means that the functions at each branch, and the overall architecture, can be optimized in terms of complexity for given performance and reliability. Some functional blocks might not even be necessary in some branches.

For example, the timing recovery component 142 may extract the sampling instances using one (or some) branches in the architecture shown in FIG. 10, and control the samplers in all other branches based on those samples. For instance, where architecture 10 is implemented with M processing branches, timing recovery circuit 142 may be applied only on the Mth branch, and its output is used to control timing in all other branches. This, of course, would result in a timing recovery circuit 142 with a complexity that is significantly reduced over one that considers signals from each branch.

Further, thermal asperity detection and cancellation can be optimized as well. Most of the energy of thermal asperity lies in low frequency bands, and very little is left on high frequencies. Therefore, for the branches in any of the architectures mentioned above that span low frequencies, thermal asperity detection and cancellation algorithms can be designed to operate very accurately, while in other branches they may not even need to be implemented.

Similarly, baseline wander cancellation can be implemented in the same way. For instance, most of the energy of baseline wander also lies in low frequencies, and cancellation algorithms for canceling this specific type of distortion might not even be implemented in the branches that do not span the lower frequencies.

Figure 11:
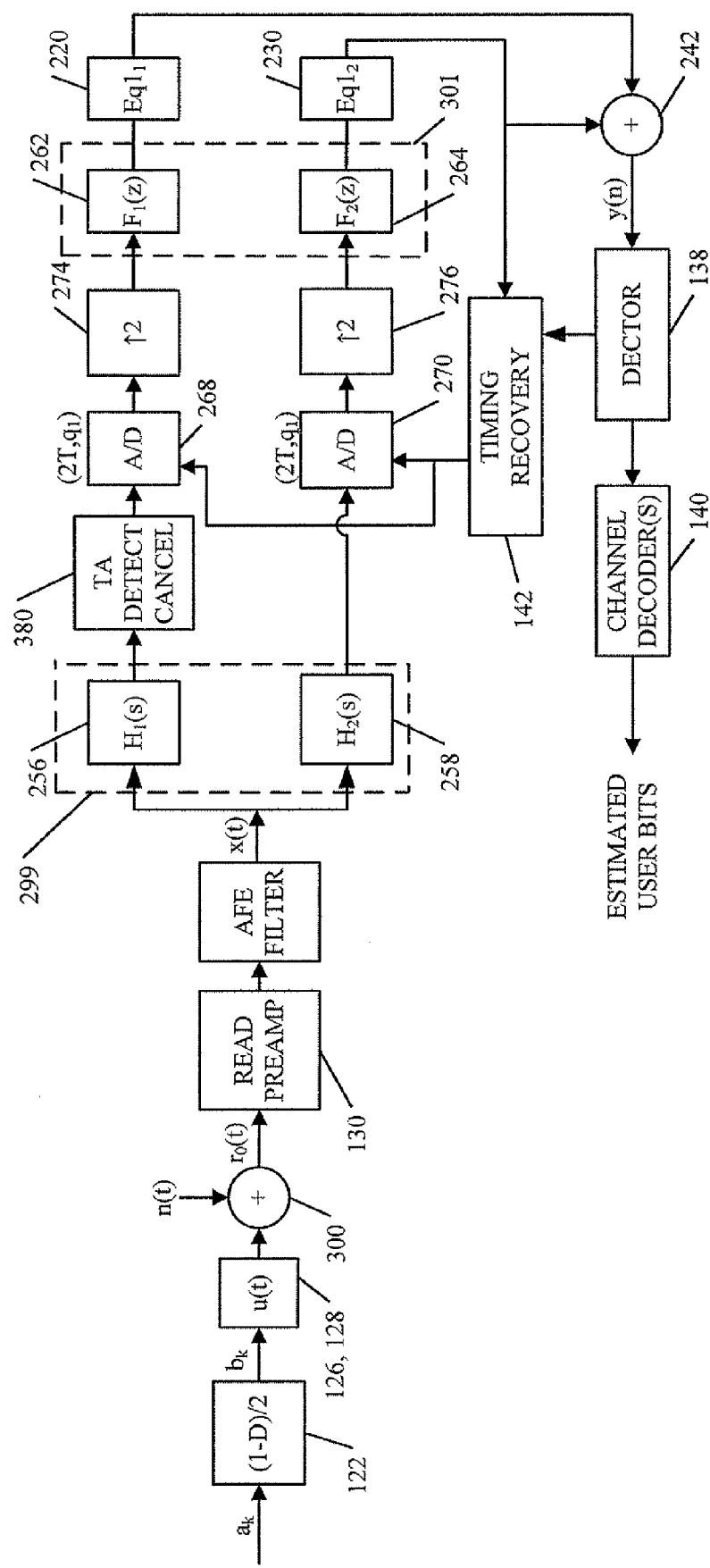
FIG. 11 is a two-branch implementation of yet another embodiment of the architecture shown in FIG. 3.

An example may be helpful. FIG. 11 is similar to that shown in FIG. 10, and similar items are correspondingly numbered. However, FIG. 11 also includes thermal asperity detection and cancellation component 380. Assume for the architecture shown in FIG. 11 that ND=$PW_{50}$/T which is equal to 1, and the channel has only a small amount of electronic noise corresponding to 30 dB SNR on top of thermal asperity and baseline wander effects.

In conventional systems, the effects of thermal asperity on system performance have been analyzed, and known methods have been proposed to cancel its affects. A realization of the effects of thermal asperity on the signal x(t) in FIG. 11 is that most of its energy is at low frequencies, which means that the thermal asperity effect will be preserved in the branches which pass low frequencies. However, for the branches in the architecture with analysis filters which filter out low frequencies, the thermal asperity effect will also be filtered out. Therefore, in the embodiment shown in FIG. 11, thermal asperity detection and cancellation component 380 applies thermal asperity detection and cancellation algorithms only where the thermal asperity effect is still present (in the embodiment shown in FIG. 11, the first branch of the architecture). Thermal asperity need not even be considered in the other processing branches, where there is no thermal asperity effect. Since thermal asperity detection and cancellation component 380 is only applied in one branch, and since that branch only needs to support a sample with half the sampling rate, compared to having a one branch architecture which operates at the full sampling rate, the implementation complexity (such as the process for generating the analog circuits, the buffer size, etc.) of thermal asperity detection and cancellation component 380 can be significantly decreased over one used in prior systems. This reduces the overall cost of the system without compromising system performance.

Figure 12:
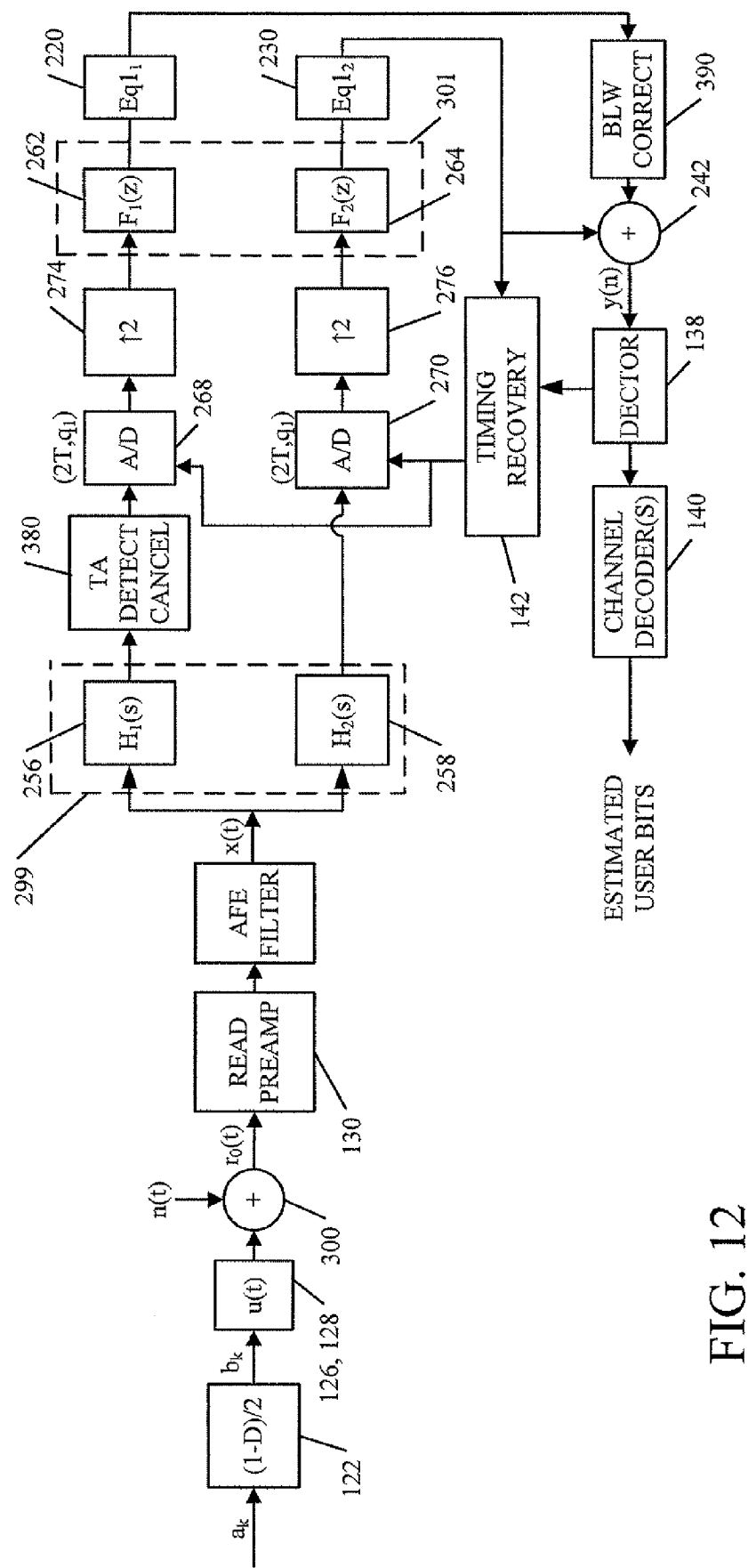
FIG. 12 is a two-branch implementation of yet another embodiment of the architecture shown in FIG. 3.

The same type of considerations can be made for components that address baseline wander distortions. For purposes of the present explanation, the baseline wander effects resulting from the highpass poles of the preamplifier 130 in the system are considered. FIG. 12 shows one embodiment of an architecture that can be used to deal with this type of baseline wander distortion. The items shown in FIG. 12 are similar to those shown in FIG. 11, and are correspondingly numbered. However, baseline wander correction component 390 is also included in the same signal processing branch as that which contains thermal asperity detection and cancellation component 380. Of course, the two components need not be in the same branch, and they are only shown that way for example and discussion purposes.

As with thermal asperity detection and cancellation, baseline wander impurity has been generally addressed by some known algorithms. The baseline wander effect is more pronounced with data sequences that have consecutive 1 s or −1 s. Similar to thermal asperity, the effect of baseline wander is located more within low frequency bands, and the effects are preserved at the output of $H_1(s)$ in FIG. 12, since $H_1(s)$ is basically a lowpass filter. However, $H_2(s)$ filters out most of the baseline wander components. Thus, the baseline wander effects are mainly observed only on the lower frequency processing branch of the architecture shown in FIG. 12. Thus, baseline wander correction component 390 is provided in that branch, to implement correction algorithms that address the effects of baseline wander distortion. Component 390 need not be applied in both branches of the architecture shown in FIG. 12 for the same reasons that thermal asperity detection and correction component 380 need not be applied in both branches.

Thus, baseline wander can be sufficiently addressed, at a significantly reduced complexity.

It can thus be seen that multiple branches of processing circuitry for a single given communication channel, using the architecture discussed herein, can be utilized to provide embodiments with less complex system solutions for processing the readback signal as well as to address specific impurities, without compromising system performance and reliability. Of course, the final embodiment of the architecture, for any given system, may be different than that discussed herein, or it can include a variety of different combinations of the architectures discussed herein, as desired.

It will also be noted, of course, that although the present discussion has proceed primarily with respect to a magnetic recording channel, any type of transmit/receive channel can benefit from the present architecture, as discussed is above with respect to FIG. 1.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the communication channel system while maintaining substantially the same functionality without departing from the scope and spirit of the present invention. In addition, although the preferred embodiment described herein is directed to a recording channel for data storage, it will be appreciated by those skilled in the art that the teachings of the present invention can be applied to systems having other communication channels, without departing from the scope and spirit of the present invention.

What is claimed is:

1. A system comprising:
 a plurality of signal processing branches processing a signal, each of the plurality of signal processing branches including at least one signal processing component that performs a signal processing operation on different portions of the signal and provides an output signal by combining outputs from the signal processing components from the plurality of signal processing branches, each of the plurality of parallel signal processing branches including:
 a preamplifier that amplifies the signal, each preamplifier having a frequency response that is different from a frequency response of other preamplifiers in other signal processing branches, wherein the frequency responses of the preamplifiers in all of the plurality of signal processing branches together define a cumulative passband that passes signals with components in a desired frequency range, and the frequency responses for each individual preamplifier defining a passband that spans less than the desired frequency range.

2. The system of claim 1 wherein there are M signal processing branches, wherein the signal is received from at least one channel that transmits information at a clock rate, and wherein the at least one signal processing component comprises:
a sampler, in each of the M plurality of signal processing branches, sampling the signal at one Mth of the clock rate.

3. The system of claim 2 wherein each sampler comprises:
an analysis filter;
an analog-to-digital converter coupled to the analysis filter; and
a synthesis filter coupled to the analog-to-digital converter.

4. The system of claim 2 wherein each sampler samples the signal at a quantization level, such that a combination of the quantization levels for all samplers determines an effective quantization level for the system.

5. The system of claim 4 wherein a quantization level for at least one of the samplers is different from a quantization level for at least another of the samplers.

6. The system of claim 2 wherein the at least one signal processing component comprises:
a front end filter, coupled to the preamplifier in each of the M signal processing branches, each front end filter having a frequency response that substantially matches the frequency response of the preamplifier to which the front end filter is coupled.

7. The system of claim 2 wherein the at least one signal processing component comprises:
a digital signal equalizer, coupled to the sampler in each of the plurality of signal processing branches.

8. The system of claim 7 and further comprising:
a timing recovery component configured to receive a timing signal from fewer than all of the plurality of signal processing branches and to control timing in all of the signal processing branches, based on the timing signal received.

9. The system of claim 1 wherein individual ones of the plurality of signal processing branches have processing components that perform different operations on the signal being processed than operations in other ones of the plurality of signal processing branches, to address distortions that occur in fewer than all of the signal processing branches.

10. The system of claim 9 wherein the processing components in individual ones of the signal processing branches comprise at least one of a thermal asperity correction component and a baseline wander correction component.

11. A communication channel system comprising:
a channel; and
a receive system, coupled to the channel, receiving an input signal transmitted through the channel, the receive system comprising:
parallel signal processing branches that each process a different portion of the input signal from portions processed by other signal processing branches, the receive system combining outputs from the signal processing branches to obtain an output signal that is an estimate of the input signal, wherein the signal processing branches comprise:
a first signal processing branch having a processing component that performs an operation on a first portion of the input signal based on signal distortion in the first portion; and
a second signal processing branch having a processing component that performs an operation, different than the operation performed on the first portion, on a second portion of the input signal based on signal distortions in the second portion; and
a timing recovery component configured to receive a timing signal from at least one, but not all, of the signal processing branches and to control timing in a plurality of the signal processing branches based on the timing signal.

12. The communication channel system of claim 11 wherein each of the parallel signal processing branches comprises:
a sampling component sampling the signal transmitted by the channel at a sampling rate that is less than a transmission rate of the channel.

13. The communication channel system of claim 11 wherein the parallel signal processing branches comprise:
a hybrid filter bank having an analysis filter and a synthesis filter in each of the parallel signal processing branches.

14. The communication channel system of claim 11 wherein the processing components in the one or more signal processing branches comprise at least one of a thermal asperity correction component and a baseline wander correction component.

15. A receive-side processing system comprising:
a plurality of parallel signal processing branches, each of the plurality of parallel signal processing branches including at least one signal processing component that performs a same signal processing operation on different portions of the input signal received from the channel in the communication system;
a timing recovery component configured to receive a timing signal from at least one, but not all of the plurality of signal processing branches and to control timing in all of the plurality of signal processing branches based on the timing signal received; and
a component configured to combine outputs from the plurality of signal processing branches to obtain an output signal that is an estimate of the input signal.

16. The receive-side processing system of claim 15, wherein the channel comprises a read channel for a data storage system receiving a signal from a data storage medium.

17. The receive-side processing system of claim 15, further comprising:
at least one preamplifier configured to amplify at least a portion of an input signal received from a channel in a communication system.

18. The receive-side processing system of claim 17, wherein the at least one preamplifier comprises a plurality of preamplifiers, each of the plurality of parallel signal processing branches including one of the plurality of preamplifiers configured to amplify the portion of the input signal processed by the signal processing branch.

* * * * *